United States Patent [19]

Zahn

[11] 4,376,503
[45] Mar. 15, 1983

[54] MAGNETIC TAPE TRANSDUCER APPARATUS DRIVE ARRANGEMENT

[75] Inventor: Heinrich Zahn, Rossdorf, Fed. Rep. of Germany

[73] Assignee: Robert Bosch GmbH, Stuttgart, Fed. Rep. of Germany

[21] Appl. No.: 240,374

[22] Filed: Mar. 4, 1981

[30] Foreign Application Priority Data

Mar. 13, 1980 [DE] Fed. Rep. of Germany ....... 3009644

[51] Int. Cl.³ .............................................. B65H 17/22
[52] U.S. Cl. ...................................... 226/181; 242/209
[58] Field of Search ................... 226/25, 33, 177, 187, 226/190, 194, 176; 242/206, 208–210

[56] References Cited

U.S. PATENT DOCUMENTS

| | | | |
|---|---|---|---|
| 3,877,627 | 4/1975 | Boase et al. | 226/33 |
| 3,985,277 | 10/1976 | Wright | 226/177 |
| 4,165,029 | 8/1979 | Mitchell | 226/25 |

FOREIGN PATENT DOCUMENTS

| | | |
|---|---|---|
| 2522582 | 5/1975 | Fed. Rep. of Germany . |
| 2609725 | 3/1976 | Fed. Rep. of Germany . |
| 2615263 | 4/1976 | Fed. Rep. of Germany . |
| 2916528 | 4/1979 | Fed. Rep. of Germany . |

Primary Examiner—Leonard D. Christian
Attorney, Agent, or Firm—Frishauf, Holtz, Goodman & Woodward

[57] ABSTRACT

To provide for positive guidance of magnetic tape, particularly for video tape recording (VTR) apparatus, in which the tape can move in either direction of rotation, tape is guided tangentially over a capstan (14) and pressed thereagainst by a pressure roller (15) which is so positioned that a line connecting the axes of the capstan (14) and the pressure roller is perpendicular to the tangential engagement of the tape (2) with the capstan (14); the pressure roller (15) is supported in this position by a support or counter roller (18) located adjacent the pressure roller in at least part-surface contact therewith, preferably at the edge zones where magnetic tape does not contact the pressure roller, and in a line parallel to the tangential engagement of the tape, resilient spring force means (114, 114'; 118, 118') being provided to press the pressure roller against the capstan and against the counter or support roller, tangential engagement of the tape permitting operation of the transport arrangement in either direction of movement and resilient engagement of the pressure roller preventing pinching or misalignment.

6 Claims, 4 Drawing Figures

MAGNETIC TAPE TRANSDUCER APPARATUS DRIVE ARRANGEMENT

Reference to related patents, assigned to the assignee of this application: U.S. Ser. No. 6/010,620, filed Feb. 9, 1979, now U.S. Pat. No. 4,254,922, WOLF et al. U.S. Ser. No. 6/810,620, filed Feb. 9, 1979, now U.S. Pat. No. 4,259,700, GAUSE. German Disclosure Documents: DE-OS 26 15 263, DE-OS 23 22 582, DE-OS 26 09 725, DE-OS 29 16 528.

The present invention relates to magnetic tape transducer apparatus and more particularly to a drive arrangement for video magnetic tape recorder/reproducers in which magnetic tape is reeled off a supply reel, passed through the transducer apparatus and a transport mechanism and then spooled on a take-up reel.

BACKGROUND

High fidelity, high quality magnetic tape transducing apparatus usually uses a capstan against which the tape is pressed by a pressure or engagement roller. The rotating capstan provides for transport of the tape at a uniform speed. The pressure roller engaging the tape at the side opposite the capstan usually have an elastic outer circumference. It is difficult to make this pressure roller with such precision and to provide bearings therefore of such precision that the surface of the pressure roller is always exactly parallel to the engaging surface of the capstan, so that the magnetic tape is pressed against the capstan with uniform force throughout its entire width. To provide for uniform pressure it has been proposed to so support the pressure roller that the axis of the shaft thereof is supported in a floating arrangement so that it can, automatically and by itself, adjust its position to be parallel to the axis of the capstan. A single degree of freedom for movement of the pressure roller shaft may be provided. A floating shaft support is described, for example, in referenced German Disclosure Document DE-OS No. 26 15 263.

The exact position of the axis of the shaft of the pressure roller is statically indeterminate if the engagement line of the pressure roller coincides with a tangent of the capstan; this tangent, for example, may be physically formed by the tape. Due to tolerances in manufacture, air trapped between the tape and the capstan, forming an air cushion and the like, the axis of the pressure roller can adjust itself in an inclination. Consequently, the axis of the pressure roller tends to oscillate and to pinch.

In the preferred form of a drive from magnetic tape, the pressure roller is offset with respect to a line perpendicular to the axis of the capstan and a tangent defined by the run-off, or take-off side of the magnetic tape (see German Patent Disclosure Documents: Nos. 26 15 263; 25 22 582). This arrangement results in a slight loop of the tape about the capstan, as well as a small loop of the tape about the pressure roller. The construction is somewhat similar, in operation, of toe-in of pulled wheels of vehicles. The quality of tape guidance of the overall arrangement is essentially determined by the precision with which the respective components are made, and particularly with the precision of that component which first engages the magnetic tape. In forward movement of the tape, the tape first engages the capstan; in reverse movement, however, the tape first engages the pressure roller with its elastic outer surface or coating. It is obvious that the surface of an elastic roller cannot be made with the same precision as that of the capstan, which is usually made of steel. Consequently, upon reverse operation of the tape, the pressure roller does not pull the tape but rather push it towards the capstan, which may result in misfeed of the tape, and a path of the tape which is undesired.

Magnetic tape video apparatus require that scanning of the tracks on the magnetic tape is of equal quality regardless of the direction of movement of the tape. Thus, in reverse operation, the accuracy of scanning should be equal, or at least equal to that of the scanning in the normal forward direction of movement. In auto-magnetic tape apparatus it has previously been proposed to permit operation in two operating directions by providing a separate capstan and pressure roller for each direction of tape movement (see German Patent Disclosure Documents: Nos. 26 09 725; 29 16 528). Duplicating the capstan and pressure roller mechanism, is expensive and additional apparatus and elements are needed to insure that the transport mechanism for either direction operates with the same accuracy and speed as the transport mechanism in the other direction. This dual system, particularly when combined with the additional apparatus to insure precisely similar operation in either direction of rotation is expensive and requires equipment, which desirably, should be eliminating.

THE INVENTION

It is an object to provide a tape transport mechanism, particularly for video tape recording (VTR) for example of studio quality, which permits operation of a tape in either direction with equal accuracy of guidance.

Briefly, a drive capstan is arranged in the apparatus such that the tape is guided over the capstan tangentially with respect thereto. A resilient mounting element, for example a pivoted or oscillatable bracket or lever supports a pressure roller, the lever and pressure roller being so positioned that a line connecting the axis of the capstan and the axis of the pressure roller is perpendicular to the tangential engagement line of the tape with the capstan. The pressure roller is resiliently biased to press the pressure roller in engagement with the tape. In order to support the pressure roller in the aforementioned position, a freely rotatable additional support or counter roller is provided, in surface engagement with the pressure roller to form a counter support therefore with respect to the resilient force which presses the pressure roller against the capstan and in the aforementioned predetermined direction tangential to the tape. The axes of the pressure roller, the capstan, and the auxiliary support or counter roller form, in plan view, a triangle, preferably a right-angle triangle.

In accordance with the preferred form of the invention, the support or counter roller has two engagement surfaces spaced apart by a distance slightly wider than the width of tape so that engagement thereof with the pressure roller will be in the region outside of that which comes in contact with the tape. Forming the counter or support roller with such spaced engagement surfaces, for example in the form of slightly projecting rings, is a preferred form.

The arrangement has the advantage that the tape is guided accurately in its path, and transported by the cap stand, regardless of the direction of movement of the tape.

DRAWINGS

Figure 1:
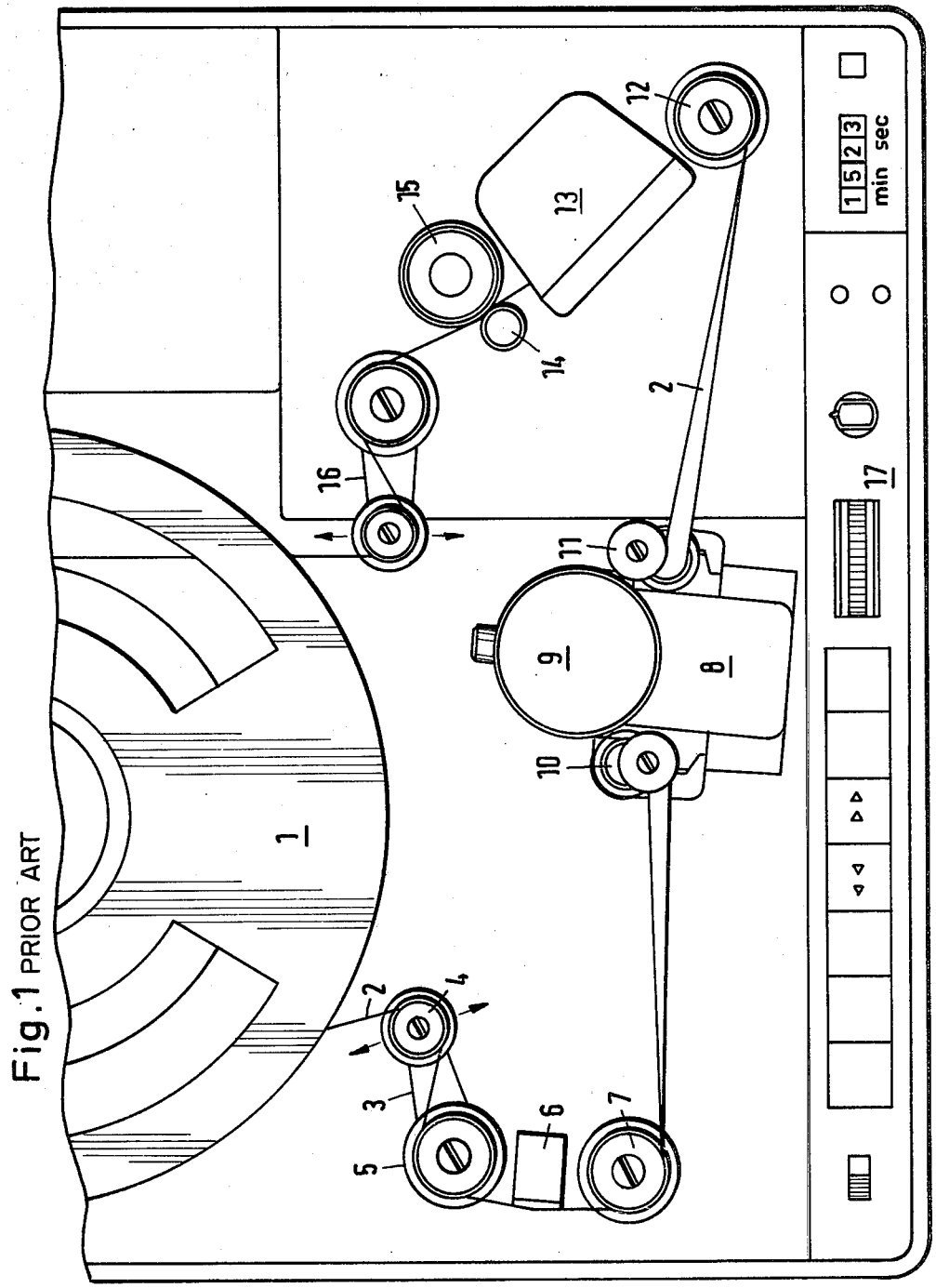
FIG. 1 is a schematic top view of a video tape transport apparatus and showing paths of the tape, in accordance with the prior art.

Two axially superimposed drive reels are provided to supply, and take up tape. Only the top, tape reel 1 is seen in FIG. 1. The reels can be driven independently. In normal direction of transport, reel 1, that is, the top reel is the take up reel, and the reel there beneath, not seen in FIG. 1, is a pay out reel. Tape 2 derived from pay out reel—not seen in FIG. 1 and beneath reel 1—is guided over two guide rollers 4,5 located on the pivot lever 3, which is spring loaded. Pivot lever 3, for example, is pivoted about the axis of the roller 5. The tape is passed over an erase head 6, and a deflection roller 7. Data are transduced from or to the tape in a transducer system 8, which for example, includes a cylindrical element 9 over which the tape is looped in a spiral path. A head wheel operating in the gap of the cylindrical element 9 provides for electromagnetic recording of signal or data on the tape. To guide the tape 2 in its spiral path, two inclined guide deflection rollers 10,11 are located at either side of the head wheel cylinder 9. The tape 2 is then guided over the further deflection roller 12, over a magnetic head unit 13 which transduces signals from or to the tape in longitudinal arrangement, for example control signals, audio signals or the like; transducer 13 may, additionally, include erase heads. The tape is transported by a capstan 14 against which it is pressed by a pressure roller 15. The pressure roller 15 is stabilized with respect to the capstan 14 by positioning the axis of the roller 15 slightly downstream—in the direction of normal movement of the tape. The tape is then guided over a spring-loaded roller arrangement 16, for example similar to the arrangement 3,4,5 for take up on the take-up reel 1. As is customary, various control buttons and indicators, collectively shown at 17 are provided. All components described are standard and well known in the art.

Figure 2:
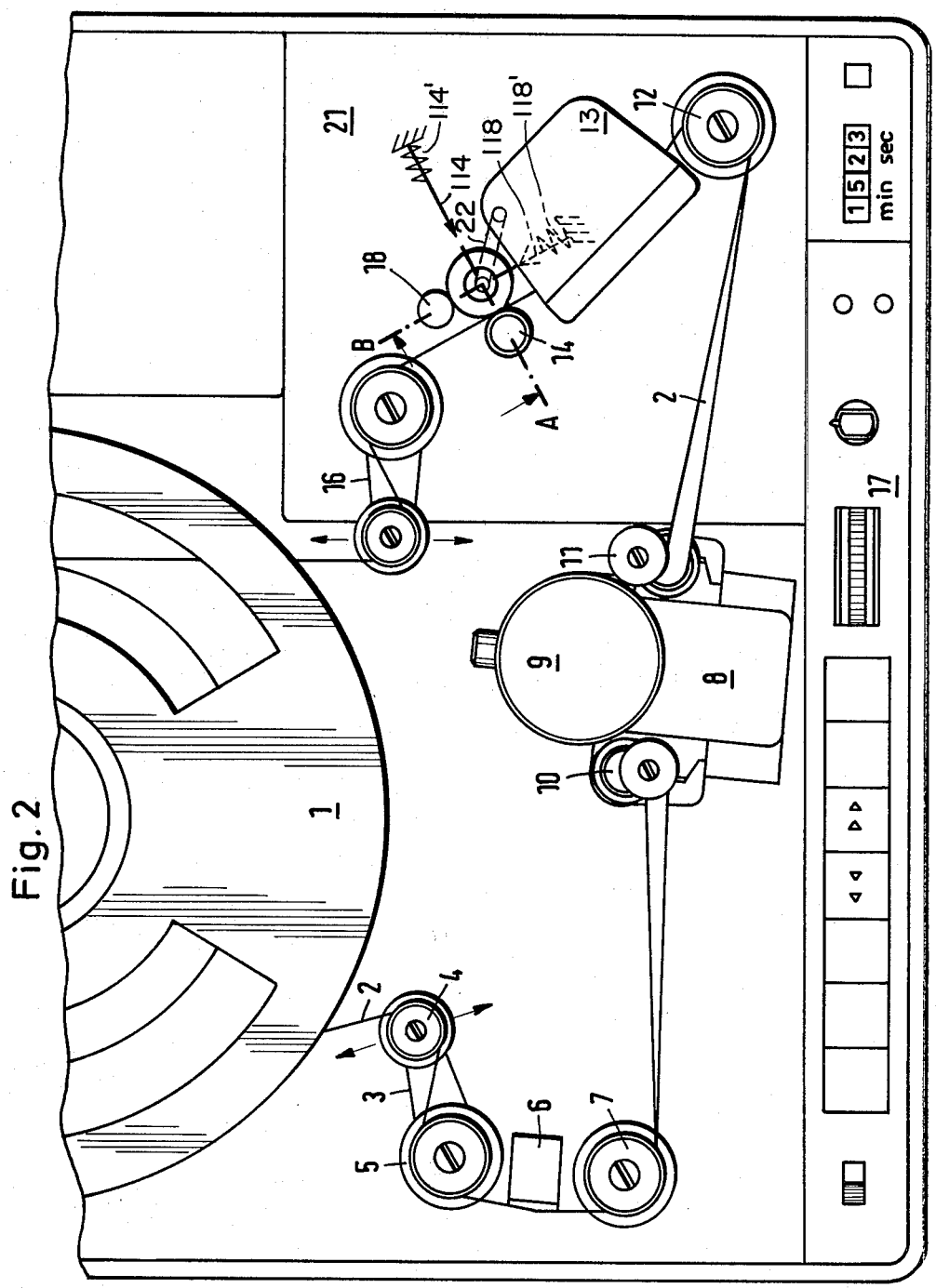
FIG. 2 is a view similar to FIG. 1 illustrating the drive arrangement in accordance with the present invention.

FIG. 2 illustrates a system in accordance with the present invention. Basically, the path of the tape is the same, and all those elements which are similar and function identically have been given the same reference numerals and will not be described again.

In contrast to the drive arrangement of FIG. 1, the tape 2 is guided in a straight line, that is, tangentially to the capstan 14 and between the pressure roller 15. The axis of rotation of the pressure roller 15 is positioned on a line perpendicular to the tangent of the tape 2 on the capstan 14. To support the pressure roller 15 in this position with high precision, a support or counter roller 18 is provided an engagement with the pressure roller 15 and located on a line parallel to the tangent of the tape 2 on the capstan 14. The axes of rotation of capstan 14, pressure roller 15 and counter roller 18, in plan view, form the corners of a right-angle triangle.

The pressure roller 15 is so supported that it can carry out an oscillating movement for self-adjustment parallel to the cylindrical surface of the capstan 14 as well as to the counter roller 18; a slight floating positioning of the bearing 24 thus is desirable. The pressure roller 15 is force-biased in the direction of the capstan 14 as schematically indicated by arrow 114. Since this force is resilient, for example by spring loading, a spring 114' is shown schematically. Additionally, the pressure roller 15 is held in surface engagement with the counter roller 18 by an engagement force 118', likewise resilient, as indicated schematically, by spiral spring 118'. Thus, the forces acting on the pressure roller 15 are so directed that a positively acting force component will be obtained in the direction of the respective elements 14, 18. The pressure roller, of course, is resiliently forced in this engagement, so that a certain yield counter the force components is possible so that the capstan 14 as well as the counter roller 18 are resiliently engaged by the pressure roller 15.

The pressure roller 15 is supported on a pivot bracket or link 22; the force components 114,118 can be obtained, for example, by resiliently biasing the link 22, for example by a spiral spring 114'.

Figure 3:
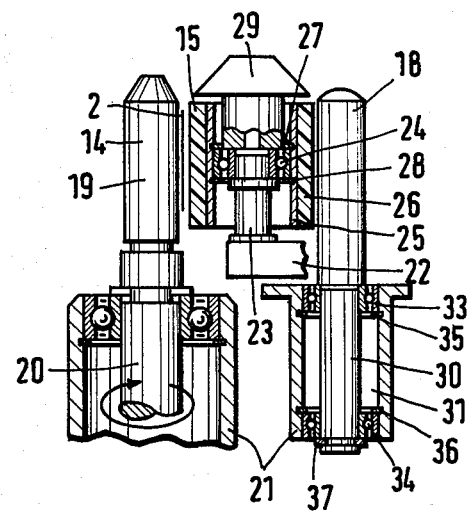
FIG. 3 is a side view of the drive arrangement taken along the angle, or off-set section line A–B of FIG. 2, to an enlarged scale, and laterally slightly exploded for ease of illustration, and to a scale enlarged with respect to FIG. 2.

The arrangement is best seen with reference to FIG. 3, which is a section along the angle section line A–B of FIG. 2, through the axis of rotation of capstan 14, the pressure roller 15, and the support or counter roller 18.

The capstan 14 has a tape engagement portion 19 which is accurately finished. Its surface has a frictional engagement with the tape 2. The shaft 20 of the transport roller 14 is accurately maintained in the frame 21 of the apparatus by a precision bearing. It is driven with constant speed from a suitable drive motor, as well known. The drive and bearing support of the capstan 14 itself, does not form a feature of the present invention, and, therefore, is only schematically shown; any suitable and well known structure may be used. The pressure roller 15 is located at the end of a pivot lever 22. The pivot lever 22 carries a stub shaft 23, on which a ball bearing 24 is positioned which, in turn, supports the outer surface of the pressure roller 15. The outer surface of the pressure roller 15, essentially, consists of a metal sleeve 25 which has an elastic outer sleeve or coating or surface 26 applied thereto. A ball bearing 24 is retained essentially centrally of the sleeve 25 by two C-snap rings 27,28. The inner race of the ball bearing 27 is pushed on the stub shaft 23 and is held in position by a dependant portion on the cover cap 29.

Figure 4:
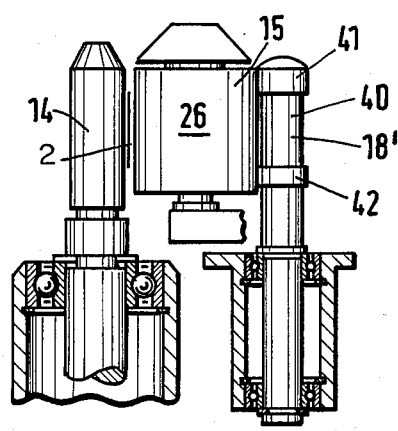
FIG. 4 is a view similar to FIG. 3 in illustrating another, and preferred embodiment.

In accordance with a feature of the invention, the support or counter roller 18 is provided, accurately rotatably supported on the frame 21 of the apparatus. The frame 21, and particularly the top surface thereof is formed with a bore 31 within a depending boss, in which two precision ball bearings 33,34 are retained, in vertically spaced arrangement, held, for example, by C-snap rings 35. The shaft 30 of the support roller 18 is preferably manufactured in a single work set-up in which the surface of the pressure roller 18 is made and the portion which fits within the bearings 33,34 as well, to maintain accuracy and concentricity. It is accurately fitted into the inner races of the ball bearing 33,34. The shaft is retained in position by a C-ring 37 at the end thereof. The drawing of FIG. 3 and 4 shows the position of the respective rollers and the tape in exploded view so that the respective components can be readily seen. In actual operation, the pressure roller 15, the tape 2, the capstan 14, and the counter roller 18 are in surface engagement. In manufacture, the bores which receive the bearings for the capstan 14 and for the support or counter roller 18 must be exactly parallel to each other, and the cylindrical surfaces which contact the magnetic tape on the capstan as well as on the pressure roller 15 must be accurately made to be exactly cylindrical.

The support on 22, or the attachment of the stub shaft 23 or the bearing 24, respectively, is so positioned, that in operation, the pressure roller 15 engages the capstan 14—with the tape 2 there between—as well as the counter or support roller 18. The pressure roller 15, thus, must be precisely guided and supported in two respectively perpendicular directions. The resulting trianglar arrangement axes of capstan 14, pressure roller 15 and counter roller 18 then permits exactly equal transport conditions with respect to the tape regardless of the direction of movement, and with the same accuracy of transport and of guidance. The pressure roller 15 neither can flatten out or pinch; rather, due to the resilient forces applied against the pressure roller and hence against the capstan 14 and the counter roller 18, in the respective directions of the forces 114,118 (FIG. 2) the pressure roller can adjust itself automatically with respect to the surfaces with which it is engaged.

Embodiment of FIG. 4: Essentially, this embodiment utilizes the same elements as those described in connection with FIG. 3, and having the same function. The only difference is the circumferential shape of the counter or support roller. The counter or support roller 18', FIG. 4, is formed with a circumferential recess between two outer cylindrical portions or ring-shaped projections 41,42. The ring-shaped cylindrical portions 41,42 press against the pressure roller 15 and co-act therewith. The support effect—as far as the pressure roller 15 is concerned—is essentially the same as that described in connection with the embodiment of FIG. 3; the elastic cover 26 of the pressure roller, however, is engaged by the cylindrical portion or sections 41,42 only at the end regions, and thus the elastic cover is subject to wear due to the counter roller only in those regions. The width of the recessed central portion 40 is preferably selected to be slightly greater than the width of the magnetic tape, although it may be similar to the width of the tape or even slightly less. The embodiment of FIG. 4, thus, is so arranged that the video tracks recorded on the tape are not contacted by the counter or support roller. Video tracks are particularly sensitive with respect to mechanical damage or engagement of the tape; thus, the shape of the counter or support roller 18' of FIG. 4 is preferred for VTR applications, and particularly for inclined track video recording. The distance between the cylindrical portions 41, 42 is not critical and if the distance selected to be less than the width of the magnetic tape, it will engage that region of the surface of roller 15 only where control tracks or audio tracks are recorded on the tape. The elastic surface of the pressure roller 15 is subject to engagement pressure, and hence some wear due to the presence of a counter or support roller 18' only in regions beyond the magnetic tape if the distance between the cylindrical portions 41,42 is selected to be wider than the tape. For many VTR applications, the form of FIG. 4 is prefered since the contact zone of the tape with the pressure roller 15 in the region where video signals are recorded can be removed from contact with the support or counter roller 18'.

Various changes and modifications may be made and features described in connection with any one of the embodiments may be used with the others, within the scope of the inventive concept.

I claim:
1. Drive arrangement for magnetic tape transducer apparatus having
    a driven capstan (14);
    means (12,13,16) guiding the tape over a circumferential portion of the capstan (14);
    a pressure roller (15) in engagement with a tape (2) at the side opposite the capstan to press the tape against the capstan;
    and resilient means (22,114,114'; 118) mounting the pressure roller to apply a resilient bias force against the tape
    wherein, in accordance with the invention
    the guide means guides the tape (2) tangent with respect to the capstan (14);
    the resilient mounting means comprises a pivoted floating mounting element (22) supporting the pressure roller and so positioning the pressure roller that a line connecting the axis of the capstan (14) and the axis of the pressure roller (15) is perpendicular to the tangential engagement of the tape (2) with the captan;
    resilient force means (114') are provided in force transmitting engagement with the pressure roller to press the pressure roller against the tape;
    and comprising a freely rotatable support or counter roller (18), in surface engagement with the pressure roller (15) to provide a counter support for the pressure roller with respect to said resilient force means, the axis of rotation of the support or counter roller (18), the axis of rotation of the pressure roller (15) and the axis of rotation of the capstan (14) being positioned on the corners of a triangle.

2. Arrangement according to claim 1, wherein said triangle on which the corners of the axes of rotation of the support or counter roller (18), the pressure roller (15) and the capstan (14) are located is a right-angle triangle.

3. Arrangement according to claim 1, wherein the surfaces of the capstan (14) and the pressure roller (15) are cylindrical.

4. Arrangement according to claim 3, wherein the surface of the support or counter roller (18) in engagement with the pressure roller is cylindrical.

5. Arrangement according to claim 3, wherein the engagement surface of the support or counter roller (18) in engagement with the cylindrical surface (26) of the pressure roller comprises two spaced cylinder sections or portions (41,42) in engagement with edge regions of an elastic surface cover (26) of the pressure roller.

6. Arrangement according to claim 5, wherein the spacing of the cylindrical surface portions or sections (41,42) is at least as wide as the width of the tape (2).

* * * * *